(12) United States Patent
Mitrovich

(10) Patent No.: US 7,943,556 B2
(45) Date of Patent: May 17, 2011

(54) ENVIRONMENTALLY FRIENDLY SOLID LUBRICANT STICKS

(76) Inventor: Michael J. Mitrovich, Kenmore, WA (US)

( * ) Notice: Subject to any disclaimer, the term of this patent is extended or adjusted under 35 U.S.C. 154(b) by 1344 days.

(21) Appl. No.: 11/295,711

(22) Filed: Dec. 5, 2005

(65) Prior Publication Data
US 2006/0128570 A1    Jun. 15, 2006

Related U.S. Application Data

(60) Continuation-in-part of application No. 10/655,082, filed on Sep. 3, 2003, now abandoned, which is a division of application No. 10/123,001, filed on Apr. 11, 2002, now Pat. No. 6,649,573.

(60) Provisional application No. 60/633,279, filed on Dec. 3, 2004, provisional application No. 60/283,869, filed on Apr. 13, 2001.

(51) Int. Cl.
*F16C 33/18* (2006.01)
*F16C 33/04* (2006.01)
*C10L 1/16* (2006.01)

(52) U.S. Cl. .................. 508/108; 508/102; 508/591

(58) Field of Classification Search .................. 508/108, 508/102, 591
See application file for complete search history.

(56) References Cited

U.S. PATENT DOCUMENTS

| | | | |
|---|---|---|---|
| 2,589,582 A | 3/1952 | Strughold et al. | |
| 3,433,742 A | 3/1969 | Banta | |
| 3,537,819 A | 11/1970 | Wiesboeck | |
| 3,541,011 A | 11/1970 | Davis et al. | |
| 3,607,746 A | 9/1971 | Caruso | |
| 3,729,415 A | 4/1973 | Davis et al. | |
| 3,944,025 A | 3/1976 | Owen | |
| 4,052,323 A | 10/1977 | Feneberger et al. | |
| 4,575,430 A | 3/1986 | Periard et al. | |
| 4,647,386 A | 3/1987 | Jamison | |
| 4,659,762 A | 4/1987 | Jenkins | |
| 4,711,320 A | 12/1987 | Dombroski et al. | |
| 4,715,972 A | 12/1987 | Pacholke | |
| 4,763,759 A | 8/1988 | Federico | |
| 4,811,818 A | 3/1989 | Jamison | |
| 4,915,856 A * | 4/1990 | Jamison ..................... | 508/103 |
| 5,076,339 A | 12/1991 | Smith | |
| 5,173,204 A | 12/1992 | Chiddick et al. | |
| 5,308,516 A | 5/1994 | Chiddick | |
| 5,337,860 A | 8/1994 | Burke et al. | |
| 5,435,925 A | 7/1995 | Jamison | |
| 5,668,091 A | 9/1997 | Grinham et al. | |
| 5,955,402 A * | 9/1999 | Hirata et al. ................. | 508/106 |
| 6,649,573 B2 | 11/2003 | Mitrovich | |
| 6,869,985 B2 * | 3/2005 | Mohanty et al. ............. | 523/124 |
| 2005/0136259 A1 * | 6/2005 | Mohanty et al. ............. | 428/409 |

FOREIGN PATENT DOCUMENTS

| | | |
|---|---|---|
| CH | 590 959 | 9/1993 |
| DE | 29719861 | 2/1998 |
| EP | 0 469 906 | 8/1991 |
| EP | 0 590 959 A2 | 4/1994 |
| FR | 774 488 | 5/1997 |
| GB | 2 207 146 A | 1/1989 |
| GB | 2 223 504 A | 4/1990 |
| WO | WO 90/15123 | 12/1990 |

OTHER PUBLICATIONS

Written Opinion From PCT Application.

* cited by examiner

*Primary Examiner* — Walter D Griffin
*Assistant Examiner* — Frank C Campanell
(74) *Attorney, Agent, or Firm* — Buchanan Nipper

(57) ABSTRACT

A solid lubricant and composition useful for lubricating the flanges of locomotive wheels, railcar wheels, rail tracks and in applications where it is desirable to reduce friction when metal contacts metal. The solid lubricant having from about 25% to about 70% by volume of a biopolymer polymeric carrier, about 5% to 75% percent by volume of organic and inorganic extreme pressure additives, about 0% to 20% by volume synthetic extreme pressure anti-wear liquid oil, and about 0% to 1% by volume optical brightener.

19 Claims, No Drawings

ENVIRONMENTALLY FRIENDLY SOLID LUBRICANT STICKS

PRIORITY

This application is a non-provisional application and claims priority from, the provisional patent application having Ser. No. 60/633,279, filed Dec. 3, 2004, entitled "ENVIRONMENTALLY FRIENDLY SOLID LUBRICANT STICKS." This application is also a continuation-in-part of and claims priority from the divisional patent application entitled SOLID LUBRICANT AND COMPOSITION filed by Michael J. Mitrovich on Sep. 3, 2003 with Ser. No. 10/655,082 now abandoned, which claims priority from the issued utility patent application Ser. No.10/123,001, filed Apr. 11, 2002 entitled Solid Lubricant and Composition filed by Michael J. Mitrovich, issued on Nov. 18, 2003 with Registration Number 6,649,573, both of which claimed priority from the provisional application entitled Solid Lubricant and Composition filed by Michael J. Mitrovich on Apr. 13, 2001, having Ser. No. 60/283,869, the disclosures of which are incorporated herein by reference.

BACKGROUND OF THE INVENTION

1. Field of the Invention

The present invention generally relates to stick lubricants and more particularly relates to natural based stick lubricants for railroad applications.

2. Background Information

For over fifty years heavy haul railroads have used a variety of methods to reduce friction between the locomotive/railcar wheel flanges and the gauge face of the rail with which it comes in contact. Railroads and transits have realized they can save substantial amounts of money in lowered maintenance and equipment replacements if lubrication is applied.

Several methods have been used including one method wherein hundreds of wayside lubricators eject hydrocarbon petroleum based lubricants onto the gauge face of the rail as the train travels through a curve. A second method for applying lubricant has been to use track inspection trucks to spray petroleum or synthetic grease onto the gauge face of the track as the inspection truck goes through a curve. A third method is to apply lubricant to the wheel flange of the locomotive whereupon the lubricant gets transferred from the wheel flange of the locomotive to the wheel flange of railcars. Lubricant is then passed back through the train as successive wheels come in contact with the rail and pick up some of the lubricant.

These types of lubrication are typically accomplished by spray devices that squirt small amounts of lubricating oil onto wheel flanges. There are inherent problems with the above-described methods of applying lubricant. First, sprayed oil has a tendency to migrate to the tread of the wheel, making it more difficult for the train to stop. Also, grease and oil on top of the rail can cause the train wheels to slip, inhibiting the ability of the brakes of the train to slow or stop the train. In addition, grease and oil on top of the rail can make it difficult for the train to gain traction from a stopped position or when climbing an incline. Secondly, to keep oil spray devices in working order, it requires excessive maintenance time and expense.

An alternative method for overcoming problems with spraying oil onto the wheel flange of the locomotive or railcar has been to use a solid lubricant stick or rod. The stick or rod is inserted into a tube that is then applied by various mechanical means to the flanges of the wheel of a locomotive or railcar via friction.

Prior art solid lubricants also have inherent problems. First, prior art lubricant sticks contain graphite or molybdenum powders because of their anti-wear properties. These prior art molybdenum disulfide compound sticks were made without polymers whereby the molybdenum disulfide was smashed together in a foil wrapper. However, this made the lubricant stick very hard and brittle, so that they could not withstand a rugged locomotive or railcar environment and the sticks would break or disappear.

Prior art solid lubricant stick compositions also have used polymeric carriers to provide durability, but have also included materials that do not provide extreme pressure anti-wear protection or are potentially hazardous to the environment. In some prior art, the sticks have promoted the ability to lubricate a particular wheel flange, but because they have not contained additives to withstand the extreme pressure of a locomotive or railcar flange against the track, the lubricant has not transferred throughout the train. In other prior art, the solid lubricant has lubricated throughout the train, but these formulas contain undesirable hazardous metallic powders, because of their anti-wear capabilities, but the metallic powders not only pollute the environment, but also may be hazardous to railroad workers.

In other prior art sticks, the lubricant is embedded within a polymeric carrier (typically a petroleum based polymer such as polyethylene), this polymeric carrier stick pressed against the wheel flange for wearing off and application of lubricant there-to. An example of such a lubricant stick is Applicant's patent (U.S. Pat. No. 6,649,573) for a solid lubricant and composition.

Other prior art patents include the following. U.S. Pat. No. 3,537,819 to Davis, et al., discloses that the characteristics of the solid lubricant such as hardness, deposition and rigidity are dependant on the molecular weight and the amount of high molecular weight polyethylene that is used. U.S. Pat. No. 3,541,011 to Davis, et al., also discloses a solid lubricant whereby the characteristics of the lubricant such as hardness, deposition and rigidity are dependent on the molecular weight and on the amount used of high molecular weight polyethylene. U.S. Pat. No. 3,729,415 to Davis, et al., discloses a combination of polyethylene and hydrocarbon oil in a stick lubricant that does not contain extreme anti-wear materials to prevent excessive wear. U.S. Pat. No. 4,915,856 to Jamison discloses an alternative solid polymeric stick formula, which includes lead and other metallic powder in either single or co-extruded compositions. While the metallic powder offers anti-wear properties, it also can pollute the environment, such as ground water, when it drops alongside and also can present hazardous conditions for rail workers. Inclusion of metallic powders, which may be considered hazardous by the E.P.A., is undesirable to railroads and transits.

Still other advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the description of the preferred embodiment is to be regarded as illustrative in nature, and not as restrictive.

SUMMARY OF THE INVENTION

In order to overcome problems inherent in the prior art there has been devised by the present invention a more environmentally friendly solid lubricant and composition useful for lubricating the flanges of locomotive wheels, railcar wheels, rail tracks, and in applications where it is desirable to reduce friction when metal contacts metal.

A first embodiment of a solid lubricant of the present invention comprises from about 15% to about 70% by volume of a polymeric carrier, 10% to 15% by volume of cornstarch or other complex carbohydrate, 5% to 75% percent by volume of organic and inorganic extreme pressure additives (preferably including an organic and inorganic powder lubricant), optionally a synthetic extreme pressure anti-wear liquid oil, and optionally an optical brightener so that the lubricant can be seen under black light conditions to allow verification that the lubricant is coating the surface to which it is applied.

In a second preferred embodiment of the present invention, the stick lubricant comprises from about 20% to about 70% by volume of at least one polymeric carrier (preferably a polylactic acid-based polymer such as polyactide (PLA)); from about 5% to about 75% by volume of at least one lubricant powder; from about 0% to about 20% by volume of at least one synthetic extreme pressure anti-wear liquid oil; and from about 0% to about 1% by volume of an optical brightener.

Still other advantages and formulations of the present invention will become readily apparent to those skilled in this art from the following detailed description wherein I have shown and described only the preferred embodiment of the present invention, simply by way of illustration of the best mode contemplated by carrying out my invention. As will be realized, the invention is capable of modification in various obvious respects all without departing from the invention. Accordingly, the description of the preferred embodiment is to be regarded as illustrative in nature, and not as restrictive.

DESCRIPTION OF THE PREFERRED EMBODIMENT

While the invention is susceptible of various modifications and alternative constructions, certain illustrated embodiments thereof have been described below in detail. It should be understood, however, that there is no intention to limit the invention to the specific form disclosed, but, on the contrary, the invention is to cover all modifications, alternative constructions, alternative uses, and equivalents falling within the spirit and scope of the invention as defined in the claims.

The present invention is a lubricant stick formulation, lubricant sticks made from said formulation, and the method of making said lubricant sticks.

In the preferred embodiment of the present invention, the invented lubricant stick is composed generally of the following formula: from about 25% to about 70% by volume of at least one polymeric carrier (preferably a portion of said polymeric carrier comprising a polylactic acid-based polymer such as polyactide (PLA), more preferably 10% PLA); from about 5% to about 75% by volume of at least one lubricant powder; from about 0% to about 20% by volume of at least one synthetic extreme pressure anti-wear liquid oil; and from about 0% to about 1% by volume of an optical brightener.

Additionally, a portion (preferably 0% to 20%) of the polymeric carrier could be replaced with an impact modifier, preferably derived from the same natural material as the polymeric carrier. The impact modifier is for making the lubricant stick, as formed, less brittle.

Preferably, this polymeric carrier that is mixed with the other compounds of the present invention's formulation begins in one of two forms. The polymeric carrier can be in either a powder or pellet form. When in a pellet form the pellets are usually between 0.1 and 0.15 inch and are irregularly shaped, or in ball, cylinder or hexagon shapes. Suitable polymeric carriers include but are not limited to: polylactic acid-based polymers, other "natural" polymers and biopolymers, polyethylene, polypropylene, methylpentene, polyolefins and/or synthetic waxes.

One or more of the polymeric carriers used in the present invention's formulation could comprise polyactide (also referred to as "PLA," and as polylactic acid-based polymers/fibers), such as the polymer produced by Cargill Dow LLC and sold under the trade name NATUREWORKS®. PLA is made from lactic acid, this lactic acid typically made from dextrose (made from cornstarch, wheat, sugar beets, dairy products, etc.) by fermentation or chemical synthesis. PLA is a biodegradable thermoplastic that in the environment can degrade within a matter of weeks. By using PLA as some or all of the polymeric carrier used, lubricant sticks of the present invention's formulations are more environmentally friendly.

My prior patent (U.S. Pat. No. 6,649,573) discloses the use of a one and/or two part stick formulation. The present invention includes any use of PLA in a lubricant stick, both one part and two part (or more) stick formulations. Thus, the first portion could include PLA, the second portion could include PLA, both portions could include PLA and/or a stick having a single portion could include PLA. In the preferred embodiment of a lubricant stick claimed here, the lubricant stick is of a single (one-part) formulation.

Additionally, applicant has found that the replacement of a portion of the polymeric carrier with cornstarch (or other complex carbohydrate) results in the remnants (the portion that wears off on the wheel flange (as the lubricant is applied to the wheel flange)) of polymeric carrier, which fall onto the ground breaking down considerably faster than without such an additive. While the amount of polymeric carrier (such as polyethylene) that becomes littered along the railway is minuscule, it never hurts to be more environmentally conscious (whether it is through adding cornstarch or using PLA) and through using embodiments of the present invention that is accomplished.

The impact modifier is preferably derived from the same natural material as the polymeric carrier. The impact modifier for making the lubricant stick, as formed, less brittle.

In the preferred embodiment, the lubricant stick uses about 5% to 75% of at least one lubricant powder by volume, this lubricant powder preferably a combination of about 80% molybdenum disulfide powder, and 20% graphite powder. It is likewise preferred that the lubricant stick further comprise between 1% and 4% by volume of at least one synthetic extreme pressure anti-wear liquid oil and about 1% of at least one optical brightener.

Other combinations of these and other ingredients will be obvious to one skilled in the art and the above formulation is given by way of illustration only. For example, the percentage of polymeric carrier(s) used can vary according to how quickly or slowly a user desires the solid lubricant be deposited against a steel surface. Likewise, the percentage of inorganic powder (such as molybdenum disulfide) can vary depending on how much organic powder (such as graphite) is used, and likewise, the percentage of organic powder used can vary depending on how much inorganic powder is used.

With respect to the liquid oil, such use is optional. Additionally, when used, the amount of liquid oil used varies from 0% to about 20% by volume of the composition. More than one type of liquid oil can be used and the percentage used can be varied depending on the percentage of inorganic or organic powders used, in example, the percentage of liquid oil can be varied depending on the percentage of liquid oil or oils needed for blending of the dry powdered materials. The addition of an optical brightener is also not required, but is preferably used so that by using a black light, the lubricant deposition on wheel flanges or rail track can be verified.

The lubricant powder(s) are used as an anti-wear additive. The lubricant powder(s) comprising 5% to 75% by volume of the formulation of the lubricant stick. In its preferred embodiment, the lubricant stick contains a minimum of about 65% by volume of one or more of inorganic molybdenum disulfide powder, graphite powder, talc powder, mica powder or calcium carbonate powder. The significant percentage of these extreme pressure anti-wear powders provides the lubrication necessary to prevent excessive wear due to rolling and sliding contact between wheel flanges of a locomotive and rail track.

The synthetic liquid oil in the formulation of the present lubricant stick also acts as an extreme pressure anti-wear additive. The preferred synthetic liquid oil is a biodegradable mineral-based oil that assists in the blending of the polymeric carrier and the extreme pressure anti-wear powders. Natural oils, including but not limited to corn oil and soybean oil, could likewise be used. A preferred ratio of about four parts per hundred to about fifteen parts per hundred of the oil can be used. In the preferred embodiment, about 5% by volume of oil in the formulation is the most effective. Less than 4% of oil by volume in the formulation is not sufficient to contribute to the mixing of the anti-wear powders and the polymeric resin of the polymeric carrier and is thus less preferred.

As previously indicated, optical brightener allows the lubricant of the present invention to be seen under black light conditions (one could shine a black light onto the railcar flange to see if the lubricant stick was applying lubricant to the flange). The optical brightener therefore verifies that the solid lubricant is coating the surface to which it is being applied. About 1% by volume of optical brightener is preferred in the formulation to ensure visibility, however 0% to about 1% by volume may be utilized.

There is a multi-step process of producing the lubricating stick. First, all materials (polymeric carrier, lubricant, oil, and/or optical brightener) are blended and extruded into pellet size shapes. It is however, not necessary to pelletize the ingredients first, for instance, they can be mixed together very well with a heavy duty mixer that confines dust, or any other manner of pelletizing the ingredients that keeps dust from flying freely. Second, a desired shape of the solid lubricant stick is made using extrusion, transfer molding, injection molding, etc.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

I claim:

1. A solid lubricant composition comprising at least one polylactic acid-based polymer and at least one lubricant powder, said composition further comprising:
   (a) from about 5% to about 55% by volume of at least one non-polylactic acid-based polymeric carrier;
   (b) about 10% to about 15% by volume of said polylactic acid-based polymer;
   (c) from about 5% to about 75% by volume of said at least one lubricant powder;
   (d) from 0% to about 20% by volume of at least one synthetic extreme pressure anti-wear liquid oil; and
   (e) from 0% to about 1% by volume of at least one optical brightener.

2. The solid lubricant composition of claim 1, consisting of about 10% by volume of said polylactic acid-based polymer.
3. The solid lubricant composition of claim 1, comprising 10% to 15% by volume of a complex carbohydrate.
4. The solid lubricant composition of claim 1, wherein said lubricant powder is selected from one or more of the group consisting of graphite and molybdenum disulfide.
5. The solid lubricant composition of claim 4, wherein said lubricant powder comprises a mixture of graphite and molybdenum disulfide.
6. The solid lubricant composition of claim 5, wherein said lubricant powder consists of a mixture of 5 parts of molybdenum disulfide powder and 1 part graphite powder, by volume.
7. The solid lubricant composition of claim 1, consisting of 60% to 65% by volume said lubricant powder.
8. The solid lubricant composition of claim 1, wherein said lubricant powder is selected from one or more of the group consisting of graphite, molybdenum disulfide, talc, mica, and calcium carbonate.
9. The solid lubricant composition of claim 1, comprising 0% to 20% by weight of an impact modifier.
10. The solid lubricant composition of claim 1, consisting of about 1% to about 5% by volume of said synthetic extreme pressure anti-wear liquid oil.
11. The solid lubricant composition of claim 1, consisting of from 0% to about 1% by weight of said optical brightener.
12. The solid lubricant composition of claim 1, wherein said polylactic acid-based polymer is polyactide.
13. A solid lubricant composition comprising:
   (a) from about 20% to about 70% by volume of polyactide;
   (b) from about 5% to about 75% by volume of at least one lubricant powder;
   (c) from 0% to about 20% by volume of at least one synthetic extreme pressure anti-wear liquid oil; and
   (d) from more than 0% to about 1% by volume of at least one optical brightener.
14. The solid lubricant composition of claim 13, wherein said lubricant powder is selected from one or more of the group consisting of graphite and molybdenum disulfide.
15. The solid lubricant composition of claim 14, wherein said lubricant powder consists of a mixture of 5 parts of molybdenum disulfide powder and 1 part graphite powder, by volume.
16. The solid lubricant composition of claim 13, wherein said lubricant powder is selected from one or more of the group consisting of graphite, molybdenum disulfide, talc, mica and calcium carbonate.
17. The solid lubricant composition of claim 13, consisting of about 1% to about 5% by volume of said synthetic extreme pressure anti-wear liquid oil.
18. The solid lubricant composition of claim 13, consisting of from 0% to about 1% by weight of said optical brightener.
19. A process for lubricating a railcar wheel flange comprising the step of pressing a solid lubricant composition against said railcar wheel flange, said solid lubricant composition comprising:
   (a) from about 20% to about 70% by volume of polyactide;
   (b) from about 5% to about 75% by volume of at least one lubricant powder;
   (c) from 0% to about 20% by volume of at least one synthetic extreme pressure anti-wear liquid oil; and
   (d) from 0% to about 1% by volume of at least one optical brightener.

* * * * *